(12) United States Patent
Rockford et al.

(10) Patent No.: US 9,304,550 B1
(45) Date of Patent: Apr. 5, 2016

(54) ADHESIVE BOND WITH INTEGRATED RELEASE MECHANISM

(71) Applicant: Apple Inc., Cupertino, CA (US)

(72) Inventors: David M. Rockford, Los Alamitos, CA (US); William F. Leggett, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/500,948

(22) Filed: Sep. 29, 2014

(51) Int. Cl.
*G06F 1/16* (2006.01)
*C09J 7/02* (2006.01)

(52) U.S. Cl.
CPC ............. *G06F 1/1658* (2013.01); *C09J 7/0232* (2013.01); *G06F 1/1616* (2013.01); *C09J 7/0225* (2013.01); *C09J 7/0246* (2013.01); *C09J 7/0264* (2013.01); *C09J 2201/128* (2013.01); *C09J 2201/20* (2013.01); *C09J 2201/606* (2013.01); *C09J 2205/302* (2013.01); *Y10T 428/14* (2015.01); *Y10T 428/1476* (2015.01); *Y10T 428/24802* (2015.01); *Y10T 428/28* (2015.01)

(58) Field of Classification Search
CPC .......... C09J 5/06; C09J 7/0246; C09J 7/0278; C09J 7/0264; C09J 7/0257; C09J 7/02; C09J 7/0232; C09J 7/0225; C09J 7/026; C09J 2201/128; C09J 2201/20; C09J 2201/606; C09J 2201/618; C09J 2205/302; B32B 3/18; B32B 5/18; B32B 7/12; B32B 38/10; Y10T 156/10; Y10T 156/1062; Y10T 156/1142; Y10T 428/248; Y10T 428/02; Y10T 428/14; Y10T 428/28; Y10T 248/1433; Y10T 248/1424; Y10T 248/1486; Y10T 428/1476; Y10T 428/1471; G06F 1/16
See application file for complete search history.

(56) References Cited

U.S. PATENT DOCUMENTS

| 5,449,540 | A |   | 9/1995  | Calhoun et al. |
|-----------|---|---|---------|----------------|
| 6,106,937 | A | * | 8/2000  | Hamerski ............... A47G 1/175 248/205.3 |
| 6,162,534 | A |   | 12/2000 | Hamerski |
| 6,644,395 | B1|   | 11/2003 | Bergin |
| 6,686,026 | B2|   | 2/2004  | Spiewak et al. |
| 7,332,206 | B2|   | 2/2008  | Callahan et al. |
| 2008/0174420 | A1 | | 7/2008 | Hsu et al. |

(Continued)

FOREIGN PATENT DOCUMENTS

WO     2012174175 A2    12/2012

OTHER PUBLICATIONS

International Search Report and Written Opinion mailed May 29, 2015 for PCT Application No. PCT/US2014/059700.

*Primary Examiner* — Patricia L Nordmeyer
(74) *Attorney, Agent, or Firm* — Downey Brand LLP (57) ABSTRACT

This application relates to methods and apparatus relating to an adhesive bond that includes an integrated release mechanism. The adhesive bond can secure components in a portable electronic device, such as a battery, to the housing of the portable electronic device. The release mechanism can be embodied as a thin layer of polymeric material sandwiched between a first adhesive layer and a second adhesive layer. The first and second adhesive layers are joined to one another by a number of pillars that extend through openings in the release mechanism. A portion of the release mechanism can protrude from the adhesive bond allowing a technician or user to pull the release mechanism out of the adhesive bond, which severs the pillars that hold the adhesive layers together. In this way, the release mechanism allows for efficient separation of the adhesively secured components.

20 Claims, 11 Drawing Sheets

(56) References Cited

U.S. PATENT DOCUMENTS

| | | | |
|---|---|---|---|
| 2009/0205784 A1* | 8/2009 | Sudo | A47G 1/175 156/391 |
| 2011/0199728 A1* | 8/2011 | Reyes | G06F 1/1616 361/679.31 |
| 2011/0210407 A1* | 9/2011 | Katayama | C08G 73/1046 257/414 |
| 2011/0220295 A1* | 9/2011 | Krawinkel | B32B 5/04 156/709 |
| 2012/0300396 A1 | 11/2012 | Bang et al. | |
| 2013/0063876 A1 | 3/2013 | Pakula et al. | |
| 2013/0153137 A1 | 6/2013 | Loescher et al. | |
| 2013/0308261 A1 | 11/2013 | Matsumoto et al. | |
| 2014/0150962 A1 | 6/2014 | Rule et al. | |
| 2015/0064386 A1* | 3/2015 | Mag | B29C 65/50 428/41.8 |

* cited by examiner

ADHESIVE BOND WITH INTEGRATED RELEASE MECHANISM

FIELD

The described embodiments relate generally to adhesively securing components. More particularly, the present embodiments relate to methods and apparatus for forming an adhesive bond between electrical components that can be easily severed to allow replacement or repair of the components.

BACKGROUND

Portable electronic devices such as laptops and cellular telephones often contain components that are adhesively secured to each other. For example, a battery may be adhesively secured to an enclosure of the portable electronic device. However, adhesively secured components can be particularly difficult to separate, requiring specialized equipment and/or specialized skill. For example, a Kevlar® thread might be employed to sever the adhesive bond between the battery and the enclosure. Unfortunately, specialized removal tools of this type can be expensive and require specialized support equipment and training to use them. In some cases, specialized removal tools can cause damage to the components in the form of dents, scratches, and/or deformation of the housing components to an extent where the housing components require replacement or at a minimum, time-consuming and/or costly rework. Moreover, environmental regulations and laws in some countries may require that a battery be removable without the use of specialized removal tools.

SUMMARY

This paper describes various embodiments that relate to a releasably adhesive bond for joining a first component to a second component.

An adhesive bond is disclosed that can include a first adhesive layer and a second adhesive layer. A release mechanism can be positioned between the first and the second adhesive layers. Further, the release mechanism may define a number of openings. The adhesive bond may also include a liner positioned between the release mechanism and the adhesive layers that prevents the release mechanism from binding to the first and the second adhesive layers. A number of pillars may be adhesively coupled with both the first adhesive layer and the second adhesive layer. Each of the pillars may pass through a corresponding opening defined by the release mechanism.

An adhesive bond that joins a first component to a second component is disclosed. The adhesive bond may include a first layer of adhesive tape and a second layer of adhesive tape. In some embodiments, the first and second layers of adhesive tape can be pressure sensitive adhesive. The adhesive bond can also include a release mechanism made from a polymeric sheet. The polymeric sheet can be located between the first and the second PSA layers. The polymeric sheet can define a number of openings. The openings may be manufactured using a die-cutting technique also known as coining. The adhesive bond may also include a liner for separating the release mechanism from the first and the second layers of adhesive tape. A number of foam pillars may be adhesively coupled with both the first layer of adhesive tape and the second layer of adhesive tape. Each of the pillars may pass through a corresponding opening of the release mechanism. The release mechanism can be shaped to minimize the amount of force required to shear through the pillars as the release mechanism is being pulled out from between the first and second layers of adhesive tape.

A portable electronic device is disclosed that has a first housing part and a second housing part that together define an internal volume. An internal component is housed within the internal volume and joined to the first housing part by an adhesive bond. The adhesive bond may include a first adhesive layer and a second adhesive layer. A release mechanism may be located between the first and the second adhesive layers. Further, the release mechanism may define a number of openings. The adhesive bond may also include a liner for separating the release mechanism from the first and the second adhesive layers. The liner can include two polymeric sheets that are adhered to both the first adhesive layer and the second adhesive layer. A number of pillars may be adhesively coupled with both the first adhesive layer and the second adhesive layer. Each of the pillars may pass through one of the openings defined by the release mechanism.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Existing methods of adhesively securing components generally result in the secured components being particularly difficult to separate. In many cases, separating adhesively joined components can cause damage to at least one of the joined components; in some cases, the damage may be severe enough to prevent reuse of the damaged component. More specifically, in the case where at least one of the adhesively joined components is a battery cell stack, damaging even one battery cell of the many battery cells disposed within the battery cell stack could potentially release hazardous materials into the environment and/or cause injury. One way to reduce the likelihood of damaging the joined components is to utilize, a specialized removal tool. For example, the specialized removal tool can take the form of a Kevlar thread that can be employed to sever the adhesive bond between the battery cell stack and an enclosure. The use of other specialized removal tools is also possible. For example, the specialized tool can alternatively take the form of a wedge that can be inserted between the components, thereby allowing a mechanical advantage to be applied at the interface between the components sufficient to sever the adhesive bond. Unfortunately, the aforementioned specialized removal tools can be expensive and difficult to operate. Furthermore, in some embodiments, use of the specialized removal tools can cause dents, scratches, and/or deformation of the components to an extent where the components require replacement or at minimum time-consuming or costly rework. Moreover, environmental regulations and laws in some countries may require that a battery be user-removable.

One solution to this issue is to integrate a release mechanism into an adhesive bond. The release mechanism can be embodied as a thin layer or sheet of material positioned between two adhesive bonding layers. The adhesive bonding layers can be joined to one another by way of a number of pillars that extend through openings defined by the release mechanism. A portion of the release mechanism can protrude from the adhesive bond to allow a technician or user wishing to sever the adhesive bond to pull upon the protruding portion of the release mechanism until the edges defining the openings of the release mechanism to shear completely through the pillars. The release mechanism can be prevented from sticking or binding to the adhesive bonding layers by a liner made up of at least two non-adhesive layers that mask adhesive surfaces of the adhesive layers oriented towards the release mechanism. In some embodiments, the pillars can separate the adhesive bonding layers far enough apart to prevent the release mechanism from being compressed between the non-adhesive layers. In this way, frictional binding between the release mechanism and the non-adhesive layers can be substantially prevented.

In some embodiments, the non-adhesive layers are made of a resin based film, along the lines of polyethylene terephthalate (PET). The release mechanism can be referred to as a floating cutting layer and can also be made from PET. In some embodiments, the pillars, the release mechanism, or both the pillars and the release mechanism can be shaped and/or arranged to minimize the force needed for the edges defining the openings in the release mechanism to shear through the pillars. The edges of the release mechanism can be sharpened during a die-cutting operation so that when the release mechanism is pulled the pulling force can be concentrated at the sharpened or shaped edges, thereby reducing an amount of force required to shear through the pillars and sever the adhesive bond. In some embodiments, the openings of the release mechanism may be arranged or offset at varying distances from the pillars so that each of the pillars are engaged sequentially, thereby reducing a magnitude of the force necessary to sever the adhesive bond.

These and other embodiments are discussed below with reference to FIGS. 1A-7; however, those skilled in the art will readily appreciate that the detailed description given herein with respect to these figures is for explanatory purposes only and should not be construed as limiting.

Figure 1A:
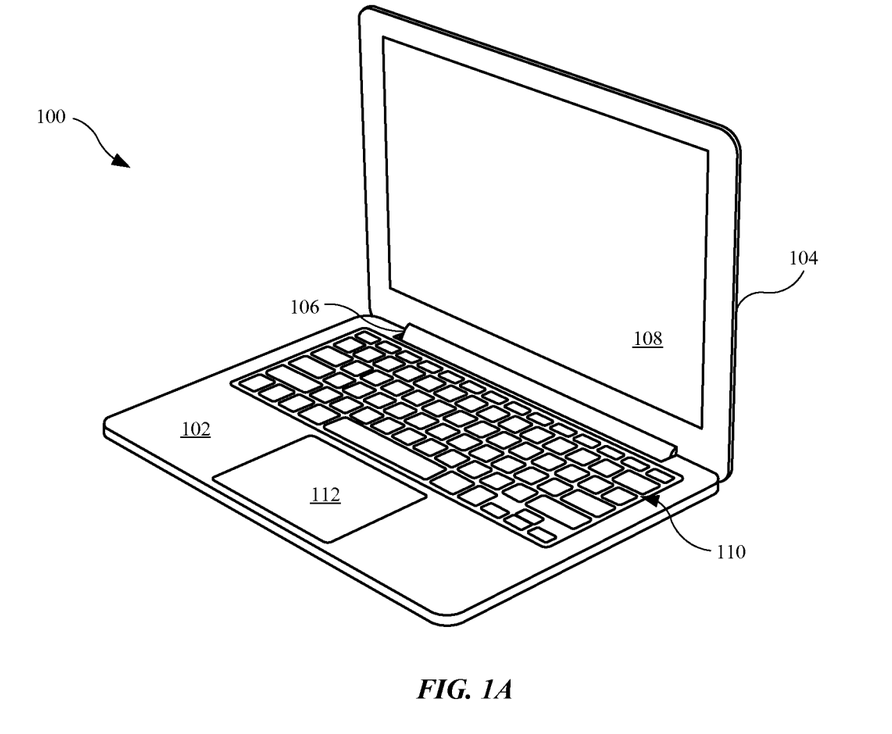
FIGS. 1A-1B show perspective views of an illustrative electronic device having components attached to each other using an adhesive bond.
Figure 1B:
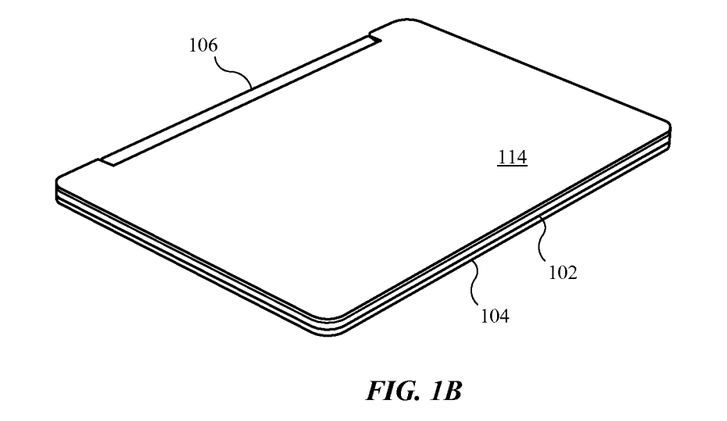

FIG. 1A shows a perspective view of exemplary electronic device 100 suitable for use with the described embodiments. In some embodiments, electronic device 100 can be a portable electronic device along the lines of a laptop computer. Electronic device 100 includes one housing component that takes the form of base 102 pivotally coupled to lid 104 by hinge assembly 106. Lid 104 can include a number of electrical components that include at least circuitry for supporting display assembly 108. Base 102 can include a number of user interface components such as keyboard 110 and track pad 112, which can allow a user to interact with electronic device 100. FIG. 1B shows a perspective view of a bottom portion of electronic device 100. In particular, a housing component taking the form of bottom cover 114 is depicted, which is operable to close an opening leading into base 102. In this way, bottom cover 114 and base 102 cooperate to define an internal volume within which internal components can be positioned and protected. Bottom cover 114 is depicted taking the form of a substantially flat bottom cover. However, bottom cover can also have other geometries along the lines of a curved geometry, in which case bottom cover 114 may only contact base 102 along a periphery of base 102.

Figure 2:
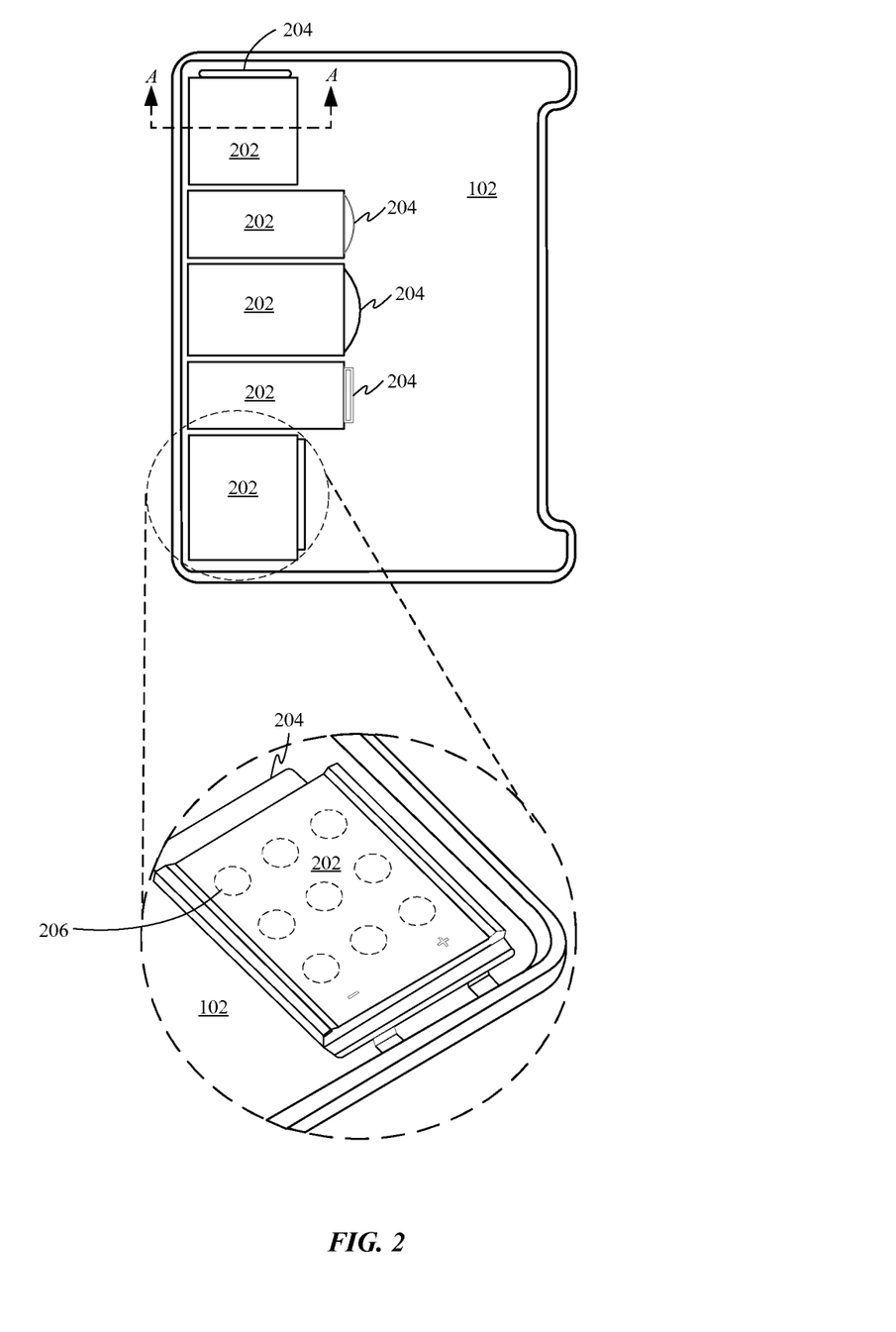
FIG. 2 shows a top view of a number of batteries adhesively coupled to a housing component of the illustrative electronic device.

FIG. 2 shows an interior view of base 102. Batteries 202 can be adhesively coupled to base 102 by a number of adhesive bonds. At least one release mechanism 204 is embedded within each of the adhesive bonds that couple batteries 202 to base 102. FIG. 2 depicts a portion of a number of release mechanisms 204 that protrude from beneath batteries 202. The portion of release mechanism 204 that protrudes from the adhesive bond can allow a technician or user wishing to sever the adhesive bond to actuate the release mechanism by pulling on the protruding portion of release mechanism 204 until the release mechanism pulls free from the adhesive bond. Removal of release mechanism 204 from between batteries 202 and base 102 in this manner completely severs the adhesive bond. While only a small portion of release mechanism 204 is shown extending from beneath battery 202, it should be understood that a greater length of material can extend from beneath battery 202 and in some embodiments the length of material extending from beneath battery 202 can include a feature such as a loop or handhold to make gripping release mechanism 204 more convenient. Additionally, a shape and size of the portion of release mechanism 204 that protrudes from the adhesive bond can be varied to prevent surrounding circuitry or components from blocking access to release mechanism 204. For example, in some embodiments the protruding portion of release mechanism 204 can be an elongated narrow tab, a hook, a loop, or any shape that allows a technician or machine to gain purchase on the tab. While batteries 202 are depicted in substantially rectangular configurations it should be understood that the batteries can also have other geometries. FIG. 2 also shows a close up view showing a perspective view of a particular battery 202 and release mechanism 204. Battery 202 is adhered to base 102 with an adhesive bond. Release mechanism 204 is embedded in the adhesive bond. FIG. 2 also depicts a number of pillars 206 embedded within the adhesive layer, which will be discussed in detail in the description of FIG. 3A. Pillars 206 are shown relative to the size of battery 202. While this embodiment shows only 9 pillars in a regular pattern it should be understood that a shape, size, and/or layout of pillars 206 can be varied to achieve any number of design objectives.

Figure 3A:
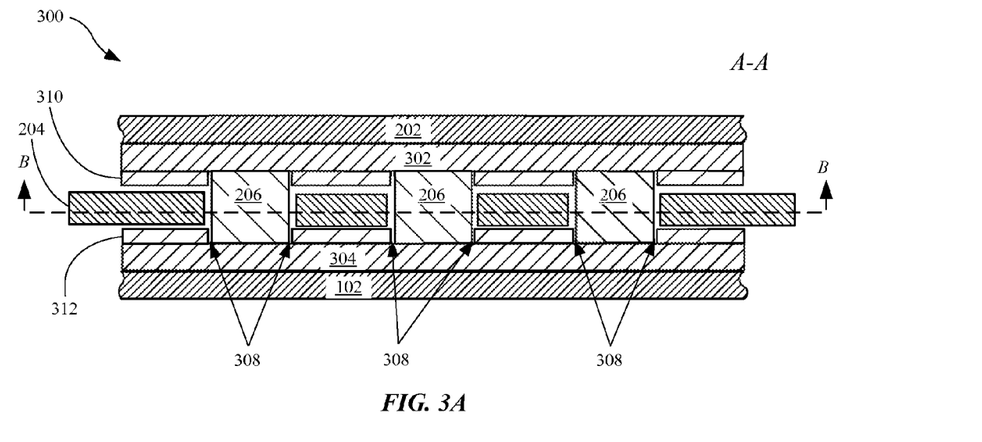
FIG. 3A shows a cross-sectional side view of a number of layers that form an adhesive bond.

FIG. 3A depicts a cross sectional side view of adhesive bond 300 in accordance with section line A-A of FIG. 2. Adhesive bond 300 can be utilized to secure a first component to a second component. For exemplary purposes, FIG. 3A shows adhesive bond 300 securing battery 202 and base 102; however, it should be understood that adhesive bond 300 can join any two components and use of this specific example should not be construed as limiting. Adhesive bond 300 includes adhesive layers 302 and 304 that are adhesively coupled to battery 202 and housing 102 respectively. In this way, adhesive bond 300 is adhesively coupled to both components. Pillars 206 join adhesive layers 302 and 304 to each other and can be formed from a compressible material that is easily susceptible to shearing forces. In some embodiments, pillars 206 can be formed from foam and have a cylindrical geometry. In some embodiments, pillars 206 can each have different geometries. Pillars 206 can establish a gap between adhesive layers 302 and 304. While pillars 206 can be subject to a certain amount of compression during an assembly process, the material of pillars 206 can maintain the gap at a minimum size that accommodates various other elements within adhesive bond 300. In particular, liners 310 and 312 can be formed from non-adhesive material that is adhesively coupled with interior facing surfaces of adhesive layers 302 and 304. In this way, liners 310 and 312 mask or cover bonding surfaces of adhesive layers 302 and 304. Liners 310 and 312 can define openings 308 to accommodate pillars 206 so that only portions of the bonding surfaces that are coupled with pillars 206 remain exposed.

Release mechanism 204 is positioned between liners 310 and 312. In this way, liners 310 and 312 can prevent release mechanism 204 from contacting adhesive layers 302 and 304, as such contact can result in undesirable adhesive coupling between release mechanism 204 and adhesive layers 302 or 304. A portion of release mechanism 204 can protrude from first and second adhesive layers 302 and 304. A user or a machine can grip and pull upon the protruding portion of release mechanism 204 to impart a shear force on pillars 206. Although pillars 206 and liner 310 and 312 are depicted as separate components, in some embodiments, pillars 206 may be molded into liner 310 and/or liner 312.

Figure 3B:
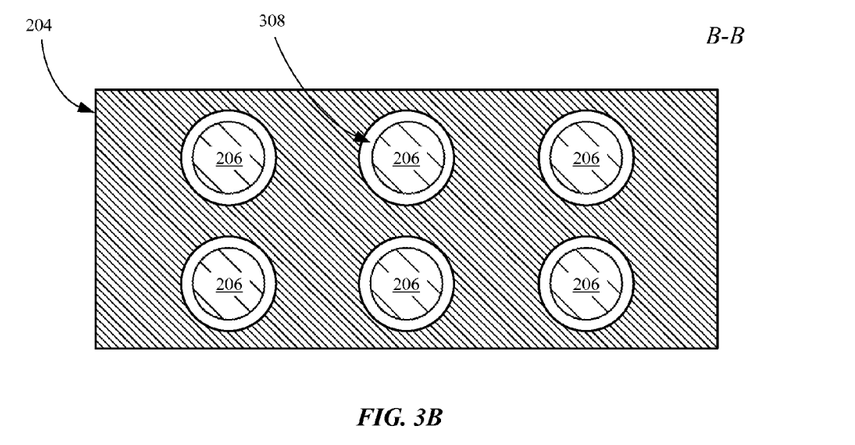
FIG. 3B shows a cross-sectional top view of a release mechanism of the adhesive bond.

FIG. 3B depicts a cross sectional top view of release mechanism 204 and pillars 206 in accordance with section line B-B. FIG. 3B additionally depicts a number of pillars 206 protruding through openings 308 in release mechanism 204. Release mechanism 204 is formed from a single piece of material. In some embodiments, release mechanism 204 can be formed by performing a die-cutting operation on a single sheet of polymeric film. As depicted, pillars 206 pass through openings 308 of release mechanism 204. In some embodiments, a shape of openings 308 can correspond directly to a geometry of pillars 206. In other embodiments a shape of openings 308 can be substantially larger than a corresponding pillar it surrounds. To increase a strength of the adhesive bond a size of pillars 206 can be increased, thereby increasing an area across which adhesive can join adhesive layers 302 and 304. An area taken up by the pillars can be increased as long as pillars 206 are not too thick to be sheared through by release mechanism 204. The relative cross sectional area of pillars 206 and the cross sectional area of release mechanism 204 can vary based on various factors. For example, the cross sectional area of pillars 206 would need to be sized to ensure structure integrity of the adhesive bond during circumstances such as drop events. Additionally, the cross sectional area of release mechanism 204 would need to be a certain size to ensure structural integrity when shearing pillars 206.

While FIG. 3B depict pillars 206 being formed in a cylindrical shape, it should be understood that pillars 206 can be formed in any number of shapes, so long as pillars 206 join first adhesive layer 302 and second adhesive layer 304. In some cases, pillars 206 are shaped in order to decrease the force required for release mechanism 204 to shear through pillars 206. For example, pillars 206 may be formed in a teardrop, rounded, or square shape. Additionally, pillars 206 can be formed from either open cell or closed cell foam. Liner 310 can be formed of PET or any material that minimizes friction between liner 310 and release mechanism 204. Release mechanism 204 can be formed from any thin film material including PET, and other plastic or metallic materials. When release mechanism 204 is formed of a metallic materials that is ferromagnetic, force may be introduced to release mechanism 204 via a magnetic field.

In an alternative embodiment, release mechanism 204 may also be formed from nitinol. Nitinol, or Nickel titanium is a metal alloy that can be resistively or inductively heated when exposed to an electric current. Pillars 206 may be formed from foam or another material that structurally fails or weakens when exposed to elevated temperatures. A technician may attach electrodes to release mechanism 204 or bring an induction coil in close proximity to the release mechanism. Release mechanism is heated by the electric current to an elevated temperature. The heated release mechanism can cause the structural integrity of pillars 206 to weaken or otherwise fail, allowing the connection established by pillars 206 to be at least partially severed.

Figure 3C:
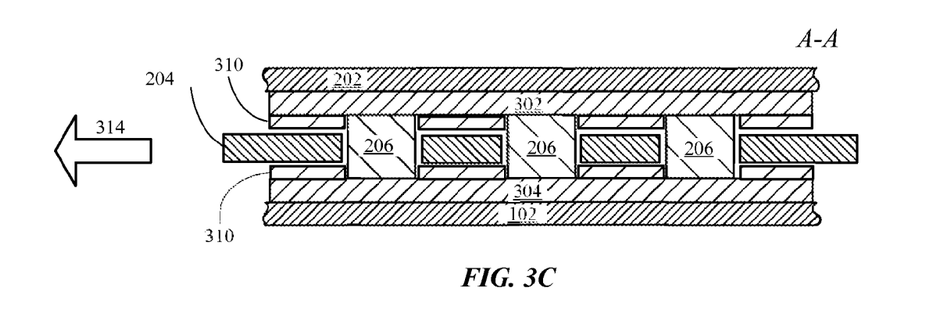
FIGS. 3C-3E show a number of cross-sectional side views of the adhesive bond while the release mechanism shears through the pillars joining the adhesive bond together.
Figure 3D:
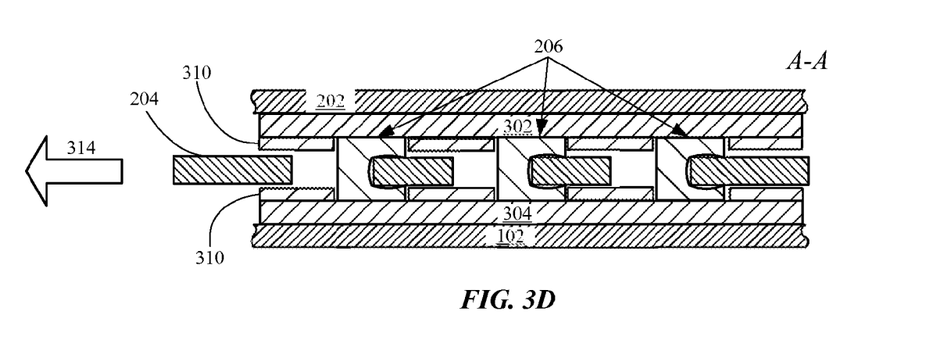
Figure 3E:
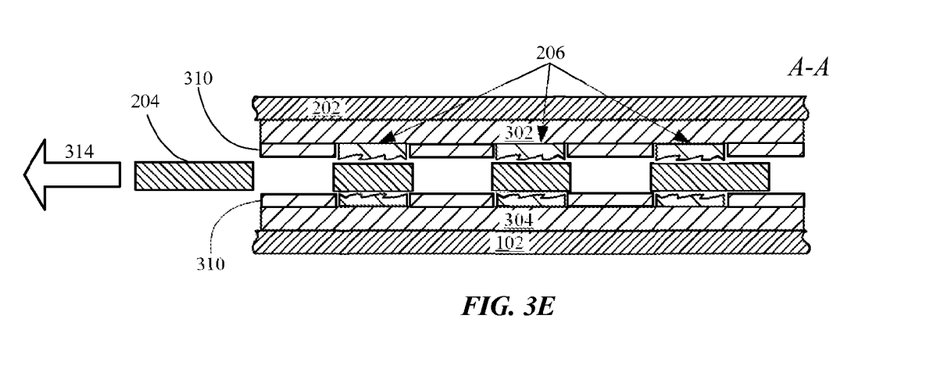

FIGS. 3C-3E show cross sectional views of adhesive bond 300 in accordance with section line A-A in which a force is imparted on release mechanism 204 that causes release mechanism 204 to shear through pillars 206. FIG. 3C shows adhesive bond 300 with no outside force imparted upon release mechanism 204. Once a user applies a lateral force in direction 314 on release mechanism 204, release mechanism 204 engages pillars 206 and begins to shear through the pillars as depicted in FIG. 3D. In some cases, such as in an automated rework line a machine can be configured to pull on the release mechanism 204. When release mechanism 204 completely shears through pillars 206, the bond between the first adhesive layer 302 and the second adhesive layer 304 breaks as depicted in FIG. 3E. In this way, adhesive bond 300 is broken.

Figure 4A:
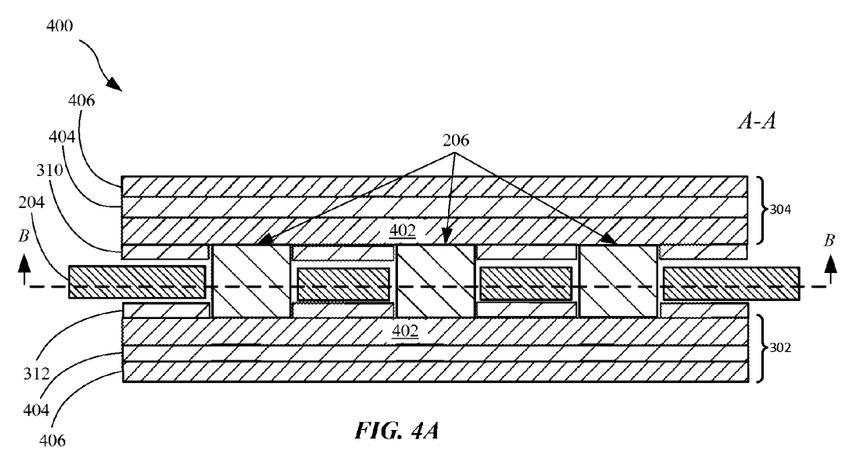
FIGS. 4A-4B show cross-sectional side views of a number of layers of various alternative adhesive bond embodiments.

FIG. 4A shows adhesive bond 400. Adhesive bond 400 can utilize adhesive layers which include a number of alternating bonding and non-bonding layers. As depicted, first adhesive layer 302 includes first bonding layer 402, non-bonding layer 404, and second bonding layer 406. Additionally, second adhesive layer includes first bonding layer 402, non-bonding layer 404, and second bonding layer 406. Utilizing alternating bonding and non-bonding layers instead of one monolithic adhesive layer allows for utilizing different types of adhesives. For example, bonding layer 406 may be formed from a first adhesive that more efficiently bonds with battery 202, and bonding layers 402 may be formed from a second adhesive that more efficiently binds with pillars 206. It should be understood that adhesive layers 302 and 304 could include any number of alternating bonding and non-bonding layers.

Figure 4B:
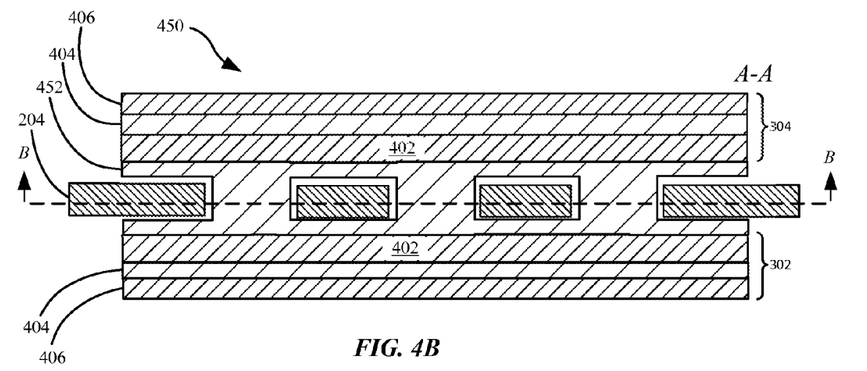

FIG. 4B shows adhesive bond 450. Adhesive bond 450 can utilize consolidated pillar structure 452 which is formed by molding pillars 206 and liners 310 and 312 into one structure. Combining the pillars and liners into one structure would increase the adhesive power of adhesive bond 450. Consolidated pillar structure 452 maintains an adhesive bond between the first and second adhesive layers. Consolidated pillar structure 452 also prevent release mechanism 204 from contacting the first and second adhesive layers thereby allowing release mechanism to float in adhesive bond 450. In some embodiments, such as the embodiment depicted in FIG. 4B, consolidated pillar structure 452 is formed of a monolithic material. This material may be either open cell or closed cell foam. In other embodiments consolidated pillar structure 452 may be a heterogeneous material wherein the portion of the consolidated pillars analogous to pillars 206 is a first material and the portion of the consolidated pillars analogous to liners 310 and 312 is a second material. For example, the first material may be foam and the second material may be PET. While consolidated pillar structure 452 is depicted as being formed from pillars 206 and liners 310 and 312, other forms are possible. In some embodiments, consolidated pillars 452 may be formed by molding pillars 206 into liners 310 and 312. In other embodiments, pillars 206 may be molded into one of liner 310 and liner 312. For example, pillars 206 may be molded into liner 310, thereby forming a partially consolidated pillar structure.

Figure 5A:
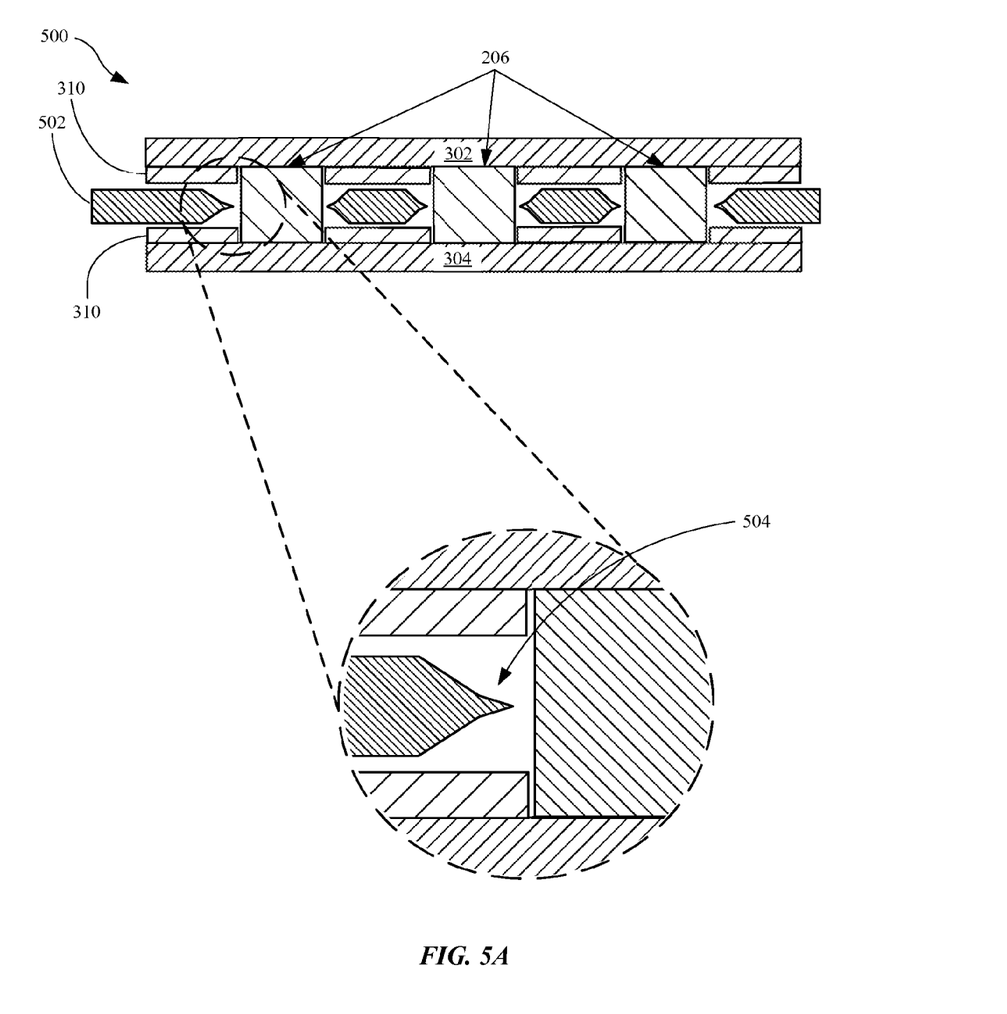
FIG. 5A shows a cross-sectional side view of another embodiment of the adhesive bond in which edges defining openings in the release mechanism have been sharpened by a coining process.

FIG. 5A shows adhesive bond 500. Adhesive bond 500 can utilize release mechanism 502, which is embedded between liners 310 and adhesive layers 302 and 304. Pillars 206 maintain an interior volume between adhesive layers 302 and 304 so that release mechanism 502 can float inside adhesive bond 500. Release mechanism 502 can be formed of a thin polymeric sheet with openings 308 formed during a stamping or die-cutting operation. In some embodiments, such as the embodiments depicted, a particular type of die-cutting operation can be applied that is sometimes referred to as coining. A coining operation can produce a clean and sharpened edge by thinning a portion of the release layer that surrounds and defines openings 308. In this way, sharp edges 504 can be produced that help to concentrate the force applied through the release layer, which reduces an amount of force required to shear through pillars 206. While sharp edges 504 are depicted many other geometries are also possible. Possible alternative edge geometries include rounded edges, or any edge geometry that reduces the force required to shear through pillars 206.

Figure 5B:
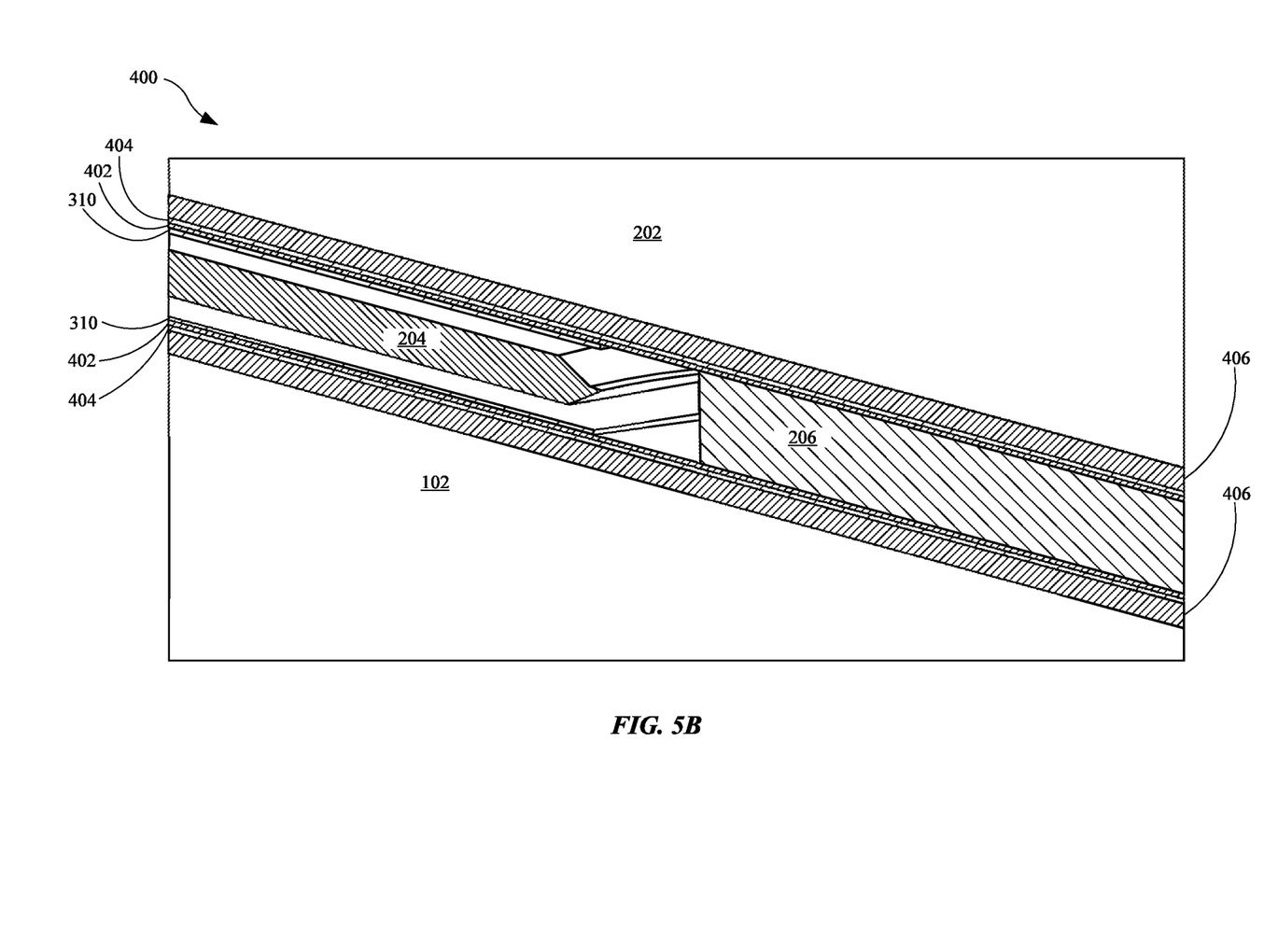
FIG. 5B shows a perspective view of a specific implementation of an adhesive bond in which the release mechanism has been formed by a coining operation.

FIG. 5B depicts a perspective view of a specific implementation of adhesive bond 400 in which release mechanism 204 has been formed by a coining operation. Adhesive bond 400 is shown securing battery 202 to base 102. Release mechanism 204 is positioned between a first adhesive layer 302 and second adhesive layer 304. First and second adhesive layers 302 and 304 each include a first bonding layer 402, a non-bonding layer 404, and a second bonding layer 406. Pillars 206 are adhesively coupled with first bonding layers 402. Liner 310 can prevent the release mechanism from contacting first bonding layers 402 as contact between release mechanism 204 and first bonding layers 402 can result in undesirable adhesive coupling between release mechanism 204 and first bonding layers 402. Utilizing alternating bonding and non-bonding layers instead of one monolithic adhesive layer allows for utilizing different types of adhesives. For example, bonding layer 406 may be formed from a first adhesive that more efficiently binds with battery 202, and bonding layers 402 may be formed from a second adhesive that more efficiently binds with pillars 206. An edge of release mechanism 204 facing 204 facing pillars 206 is formed by a coining operation in order to reduce the amount of force required to shear through pillars 206.

Figure 6A:
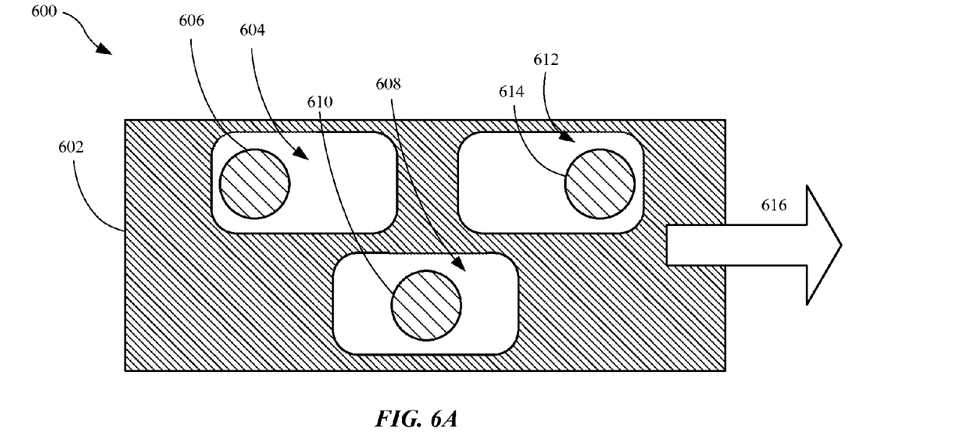
FIG. 6A shows a cross-sectional top view of the release mechanism in which the openings defined by the release mechanism have a staggered configuration.

FIG. 6A shows a top cross-sectional view of release mechanism 602 that defines a number of offset openings. Release mechanism 602 can be embedded between a liner, a first adhesive layer and a second adhesive layer to form adhesive bond 600. Pillars 606, 610, and 614 maintain an interior volume between the adhesive layers, allowing release mechanism 602 to float between the adhesive layers and liners. As depicted, pillars 606, 610, and 614 extend through openings 604, 608, and 612. Offset openings 604, 608, and 612 are depicted as being offset variable distances from pillars 606, 610, and 614. A technician or machine may apply a lateral force in direction 616. Because of the variable offset between the pillars and the openings, release mechanism can initially engage a single pillar or a group of pillars that number less than the total amount of pillars. In this way, less force is required to shear through the pillars than if the release mechanism were to engage all the pillars concurrently. While openings 604, 608 and 612 as well as pillars 606, 610, and 614 are depicted as singular sets of openings and pillars, one opening may simultaneously engage a number of pillars. For example, pillar 606 can represent a group of pillars extending through opening 604. While openings 604, 608, and 612 are depicted as rounded slots, the openings may also have any number of geometries, including circular, oval, or square geometries.

Figure 6B:
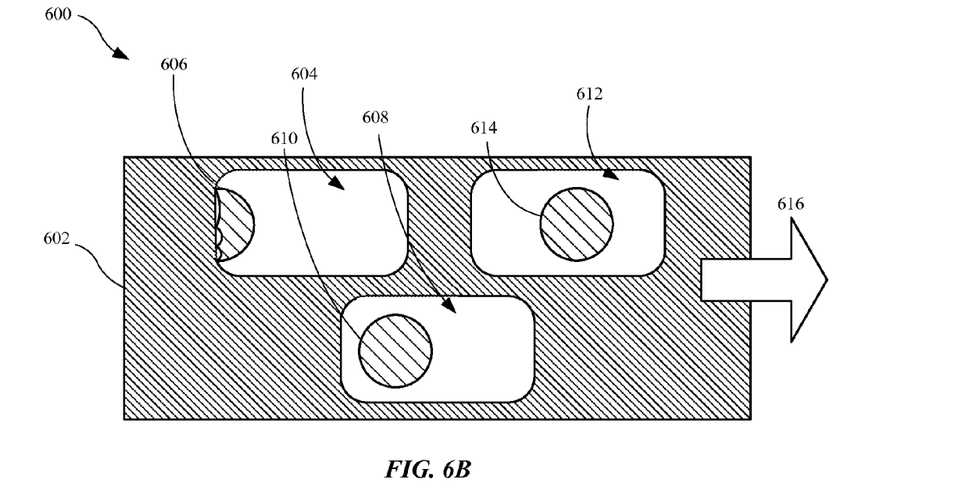
FIGS. 6B-6E show cross-sectional top views of the release mechanism depicted in FIG. 6A while the release mechanism is used to release the adhesive bond.
Figure 6C:
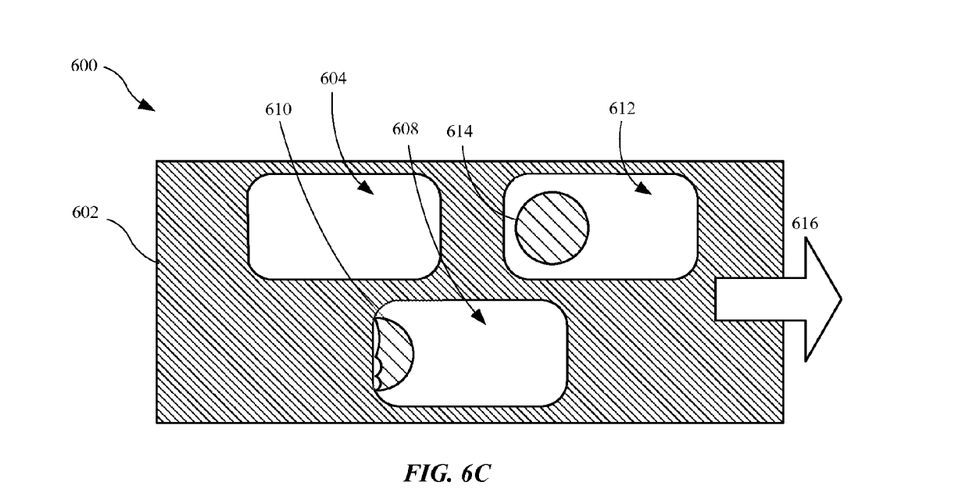

FIGS. 6B-6C depict release mechanism shearing through pillars 606 and 610 as a technician or machine applies a lateral force in direction 616 to release mechanism 602. First, only opening 604 engages pillar 606 as shown in FIG. 6B. As a result, less force is required to shear through pillar 606 than if all openings 604, 608, and 612 were engaged with pillars. After pillar 606 is completely sheared through, opening 608 engages pillar 610 as depicted in FIG. 6C. After pillar 610 is sheared through, opening 612 engages pillar 614 and shears through pillar 614. Because release mechanism 602 only engages a single pillar at a given time, less force is required to shear through the pillars, albeit over a longer pull distance.

Figure 6D:
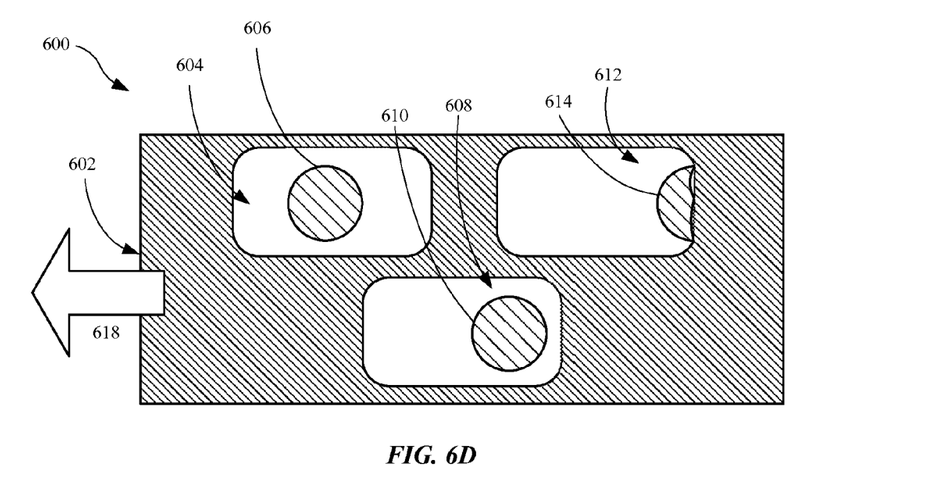
Figure 6E:
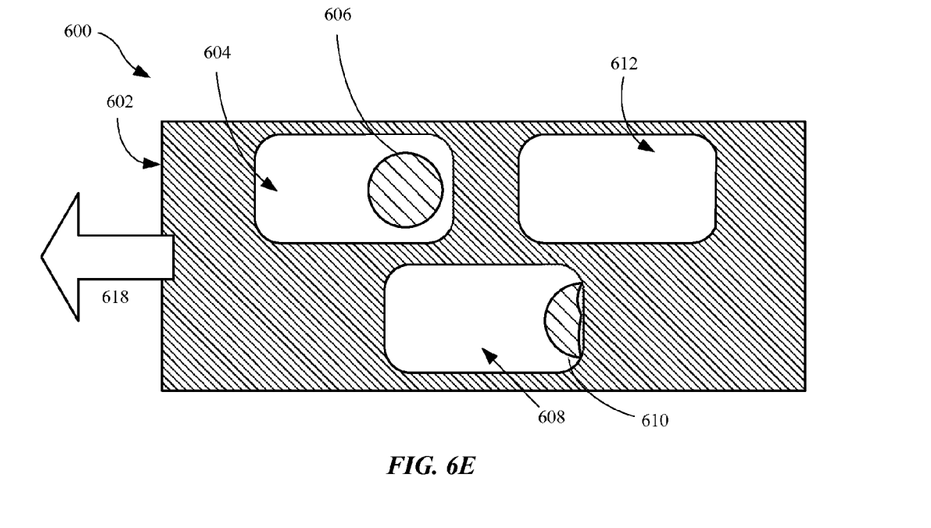

FIGS. 6D-6E depicts how release mechanism 602 can be equally effective being pulled in direction 618. Release mechanism 602 is depicted shearing through pillars 614 and 610. At first, as depicted in FIG. 6D, only opening 612 engages pillar 614. Release mechanism 602 shears through pillar 614 with one of the edges the defines opening 612 while pillar 606 remains unengaged with release mechanism 602. While release mechanism 602 shears through pillar 614, release mechanism 602 begins to engage pillar 610 through opening 608. FIG. 6E depicts release mechanism 602 fully sheared through pillar 614 and release mechanism engaging pillar 610. As release mechanism 602 shears through pillar 610, release mechanism 602 begins to engage pillar 606 through opening 604. In this way, release mechanism 602 only engages a single pillar 606, 610, or 614 at a given point in time thereby reducing the amount of force required at a given point in time to completely sever adhesive bond 600.

Figure 7:
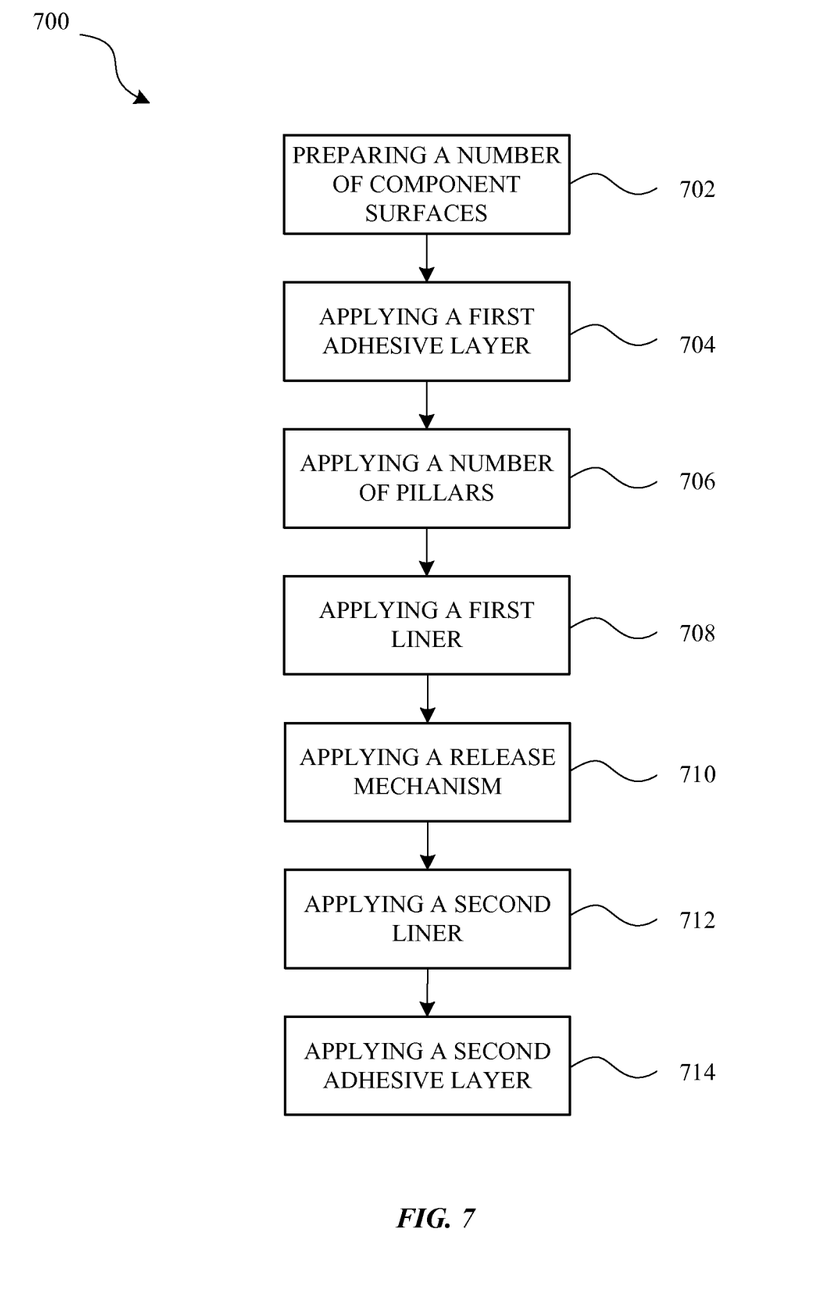
FIG. 7 shows a flow diagram representing a method for forming the adhesive bond.

FIG. 7 illustrates a flow chart depicting a method 700 for manufacturing and utilizing an adhesive bond in accordance with an embodiment of the invention. As shown, method 700 begins at step 702 which involves preparing the surface of the first and second components. For example the first component can be an enclosure of a portable computer device and the second component can be a battery. Preparation can involve cleaning the surface of the first and second components. Step 704 involves applying a first adhesive layer to the second component. Step 706 involves applying a number of pillars to the first adhesive layer. In step 708 a first liner is applied to the first adhesive layer. In step 710 the release mechanism is positioned upon the first liner. In step 712 a second liner is applied above the release mechanism. Finally, step 714 involves applying a second adhesive layer to the second liner and the second component.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An adhesive bond for joining a first component to a second component, the adhesive bond comprising:
    a first adhesive layer;
    a second adhesive layer;
    a release mechanism disposed between the first and second adhesive layers, the release mechanism defining a plurality of openings;
    a liner that separates the release mechanism from the first and second adhesive layers; and
    a plurality of pillars adhesively coupled with both the first adhesive layer and the second adhesive layer, each of the pillars passing through a corresponding opening of the release mechanism.

2. The adhesive bond as recited in claim 1, wherein the release mechanism comprises a die-cut polymeric sheet.

3. The adhesive bond as recited in claim 2, wherein the release mechanism extends from one end of the adhesive bond.

4. The adhesive bond as recited in claim 3, wherein the release mechanism is configured to cut through the plurality of pillars when the release mechanism is pulled out from between the first and second adhesive layers.

5. The adhesive bond as recited in claim 4, wherein the plurality of pillars are formed from foam.

6. The adhesive bond as recited in claim 1, wherein the plurality of openings are configured to sequentially engage the pillars as the release mechanism is being removed from the adhesive bond.

7. The adhesive bond as recited in claim 1, wherein the first adhesive layer is configured to bond with the first component and the second adhesive layer is configured to bond with the second component; and the first component is a battery cell and the second component is a portable computer device housing.

8. The adhesive bond as recited in claim 1, wherein the liners substantially prevents all contact between the release mechanism and at least one of the first adhesive layer and the second adhesive layer.

9. The adhesive bond as recited in claim 1, wherein the first and second adhesive layers each comprise:
    one or more adhesion layers; and
    one or more non-adhesion layers alternating with the one or more adhesion layers.

10. The adhesive bond as recited in claim 1, wherein the first and second adhesive layers each comprise double-sided tape.

11. The adhesive bond as recited in claim 1, wherein a portion of the release mechanism that defines each of the plurality of openings is sharpened.

12. An adhesive bond for joining a first component to a second component, the adhesive bond comprising:
    a first pressure sensitive adhesive (PSA) layer;
    a second PSA layer;
    a release mechanism comprising a polymeric sheet at least partially disposed between the first and second PSA layers, the polymeric sheet defines a plurality of die-cut openings;
    a liner that separates the release mechanism from the first and second PSA layers and includes openings corresponding to the openings defined by the polymeric sheet; and
    a plurality of foam pillars, each of the foam pillars being adhesively coupled with both the first PSA layer and the second PSA layer and passing through a corresponding die-cut opening defined by the polymeric sheet,
    wherein the release mechanism is shaped to minimize an amount of force required to cut through the plurality of pillars when the release mechanism is pulled out from between the first and second PSA layers.

13. The adhesive bond as recited in claim 12, wherein the plurality of die-cut openings are defined by sharpened edges formed by a coining operation.

14. The adhesive bond as recited in claim 13, wherein each of the plurality of pillars has a shape and size in accordance with a corresponding one of the plurality of die-cut openings.

15. The adhesive bond as recited in claim 13, wherein the sharpened edges defining the plurality of openings are configured to sequentially engage the pillars as the release mechanism is being removed from the adhesive bond.

16. The adhesive bond as recited in claim 15, wherein the plurality of openings comprise elongated rounded slots, circles, ovals, or square slots.

17. A portable electronic device, comprising:
    a first housing component;
    a second housing component that cooperates with the first housing component to define an interior volume;
    an internal component housed inside the interior volume and joined to the first housing component via an adhesive bond, the adhesive bond comprising:
        a first adhesive layer;
        a second adhesive layer;
        a release mechanism disposed between the first and second adhesive layers, the release mechanism defining a plurality of openings;
        a liner comprising a first layer adhered to the first adhesive layer and a second layer adhered to the second adhesive layer that separates the release mechanism from the first and second adhesive layers; and
        a plurality of pillars adhesively coupled with both the first adhesive layer and the second adhesive layer, each of the pillars passing through a corresponding opening of the release mechanism.

18. The portable electronic device as recited in claim 17, wherein the internal component is a battery cell.

19. The portable electronic device of claim 17, wherein the portable electronic device comprises a laptop computer.

20. The portable electronic device of claim 17, wherein the release mechanism extends from at least one end of the adhesive bond allowing a technician to apply a force operable to cut through the plurality of pillars.

\* \* \* \* \*